US010884202B1

(12) United States Patent
Jenkins et al.

(10) Patent No.: US 10,884,202 B1
(45) Date of Patent: Jan. 5, 2021

(54) ETCHED OPTICAL ASSEMBLY HOUSING

(71) Applicant: Facebook Technologies, LLC, Menlo Park, CA (US)

(72) Inventors: Kurt Allen Jenkins, Sammamish, WA (US); Chad Lichtenhan, Issaquah, WA (US); Michael Patrick Schaub, Redmond, WA (US); Byron Taylor, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/552,305

(22) Filed: Aug. 27, 2019

(51) Int. Cl.
*G02B 6/42* (2006.01)
*G02B 27/01* (2006.01)

(52) U.S. Cl.
CPC ......... *G02B 6/4256* (2013.01); *G02B 6/4274* (2013.01); *G02B 27/0172* (2013.01); *G02B 27/0176* (2013.01)

(58) Field of Classification Search
CPC ................ G02B 6/4256; G02B 6/4274; G02B 27/0172; G02B 27/0176
USPC .......................................................... 385/92
See application file for complete search history.

(56) References Cited

U.S. PATENT DOCUMENTS

| | | | |
|---|---|---|---|
| 6,366,380 B1* | 4/2002 | Chesavage ........... | G02B 6/4277 385/88 |
| 9,872,419 B1* | 1/2018 | Arekar ................. | H05K 9/0009 |
| 2005/0047721 A1* | 3/2005 | Chen ..................... | G02B 6/357 385/40 |
| 2006/0039123 A1* | 2/2006 | Malagrino, Jr. ..... | G02B 6/4201 361/727 |
| 2016/0290602 A1* | 10/2016 | Chang ................... | G02B 6/009 |

* cited by examiner

*Primary Examiner* — Jerry M Blevins
(74) *Attorney, Agent, or Firm* — Freestone Intellectual Property Law PLLC; Aaron J. Visbeek; Andrew J. Cameron

(57) ABSTRACT

A housing for an optical assembly includes a base and at least one finger. The base includes a hole configured to pass light to or from an electronic component. The finger is bent at an angle with respect to the base for securing the optical assembly within the housing. The base and the finger comprise a single monolithic structure of a sheet material.

17 Claims, 17 Drawing Sheets

ETCHED OPTICAL ASSEMBLY HOUSING

FIELD OF DISCLOSURE

Aspects of the present disclosure relate generally to optical assembly housings, and in particular but not exclusively, relate to etched optical assembly housings.

BACKGROUND

A head mounted device is a wearable electronic device, typically worn on the head of a user. Head mounted devices may include one or more electronic components for use in a variety of applications, such as gaming, aviation, engineering, medicine, entertainment, activity tracking, and so on. Some head mounted devices may perform eye-tracking which may enhance the user's viewing experience. Thus, some conventional head mounted devices may incorporate an eye-tracking system that includes a camera and optional light source for tracking movements of the user's eye.

The size of the various optical elements included in the eye-tracking system, such as lenses, polarizers, waveplates, etc. may be dependent on the particular application. Thus, as the need for the miniaturization of the eye-tracking system increases, the need for the miniaturization of the various optical systems used by the eye-tracking system also increases.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

DETAILED DESCRIPTION

Various aspects and embodiments are disclosed in the following description and related drawings to show specific examples relating to etched optical assembly housings. Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

Figure 1:
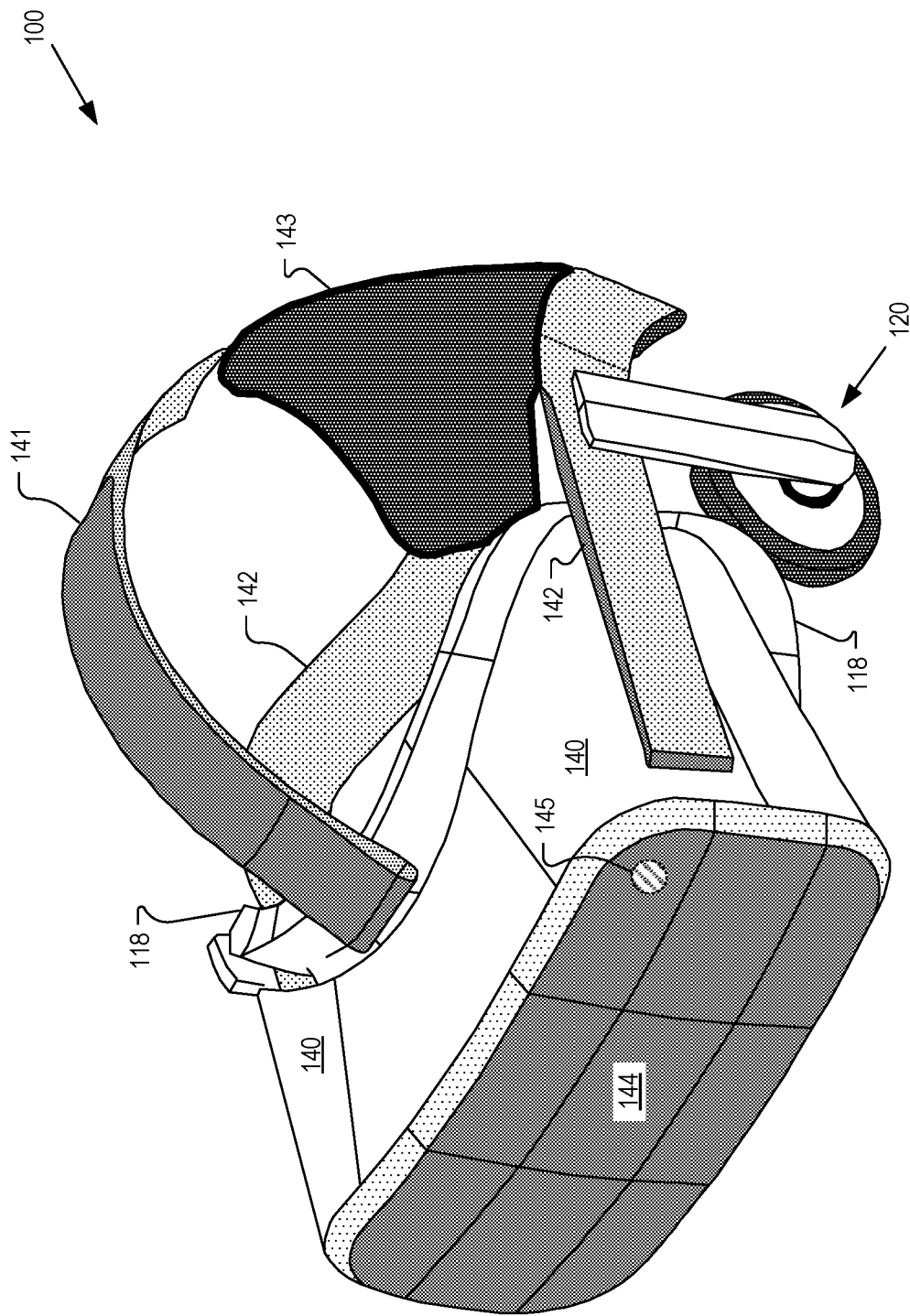
FIG. 1 illustrates a head mounted display (HMD), in accordance with aspects of the present disclosure.

FIG. 1 illustrates a head-mounted device (HMD) 100, in accordance with aspects of the present disclosure. An HMD, such as HMD 100, is one type of head mounted device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof. The illustrated example of HMD 100 is shown as including a viewing structure 140, a top securing structure 141, a side securing structure 142, a rear securing structure 143, and a front rigid body 144. In some examples, the HMD 100 is configured to be worn on a head of a user of the HMD 100, where the top securing structure 141, side securing structure 142, and/or rear securing structure 143 may include a fabric strap including elastic as well as one or more rigid structures (e.g., plastic) for securing the HMD 100 to the head of the user. HMD 100 may also optionally include one or more earpieces 120 for delivering audio to the ear(s) of the user of the HMD 100.

The illustrated example of HMD 100 also includes an interface membrane 118 for contacting a face of the user of the HMD 100, where the interface membrane 118 functions to block out at least some ambient light from reaching to the eyes of the user of the HMD 100.

Example HMD 100 may also include a chassis for supporting hardware of the viewing structure 140 of HMD 100 (chassis and hardware not explicitly illustrated in FIG. 1). The hardware of viewing structure 140 may include any of processing logic, wired and/or wireless data interface for sending and receiving data, graphic processors, and one or more memories for storing data and computer-executable instructions. In one example, viewing structure 140 may be configured to receive wired power and/or may be configured to be powered by one or more batteries. In addition, viewing structure 140 may be configured to receive wired and/or wireless data including video data.

Viewing structure 140 may include a display system having one or more electronic displays for directing light to the eye(s) of a user of HMD 100. The display system may include one or more of an LCD, an organic light emitting diode (OLED) display, or micro-LED display for emitting light (e.g., content, images, video, etc.) to a user of HMD 100.

In some examples, an electronic component 145 may be included in viewing structure 140. In some aspects, the electronic component 145 is a camera or image sensor for capturing image(s) of an eye of a user of HMD 100 for eye-tracking operations. In other aspects, the electronic component 145 is a Simultaneous Localization and Mapping (SLAM) sensor, such as an optical sensor, rangefinder, LiDAR sensor, sonar sensor, etc., for mapping the user and/or environment surrounding the HMD 100. In other examples, electronic component 145 may be a laser or other light-emitting device.

In some aspects, the electronic component 145 may be mated with an optical assembly that includes one or more small-diameter optical elements, such as a lens, a polarizer, a waveguide, reflector, a waveplate, etc. In some aspects, a "small-diameter" optical element refers to an optical element having a diameter (e.g., aperture) that is 3 millimeters or less. As mentioned above, as the requirements for the miniaturization of the various systems (e.g., eye-tracking system or SLAM system) of an HMD increases, so too does the need to reduce the size of the optical systems that may be incorporated with the electronic component 145.

Conventional optical assembly mounting techniques include fitting various optical elements into a cylindrically-shaped barrel which in turn provides the alignment of the various optical elements with respect to one another and with respect to the electronic component. Conventional barrels are typically formed from a molded material, such as plastic. However, there are size limitations when molding a plastic barrel. Specifically, there are limits on how thin the walls of the plastic barrel may formed while still providing the structural rigidity needed to support and maintain the position of the optical assembly.

Accordingly, aspects of the present disclosure provide a housing for an optical assembly that is formed from a sheet material, such as sheet metal. In one aspect, the sheet material is etched to form a base (e.g., including a hole for passing light to or from an electronic component) and one or more fingers. The fingers may then be bent at an angle with respect to the base to provide a single monolithic structure for securing the optical assembly within the housing. In some aspects, several registration features may also be etched onto a surface of the fingers prior to bending. The registration features may be grooves and/or bumps that are configured to mate with one or more optical elements for mechanically securing and/or optically aligning the optical element within the housing.

In some examples, the sheet material used to form the housing may be relatively thin (e.g., less than 100 microns). Thus, the resulting housing may provide a smaller width (i.e., cross-section) when compared to conventional molded housings, even when both are utilized to house similarly sized small-aperture optical elements. Accordingly, a reduced-size housing, in accordance with the aspects described herein, may provide a reduction in the overall size of the optical system which may provide the designer additional flexibility in placement of the optical system within a head mounted device and/or may allow for additional features/components to be added, or may even allow for a smaller profile to be implemented in the overall head mounted device, itself.

Figure 2:
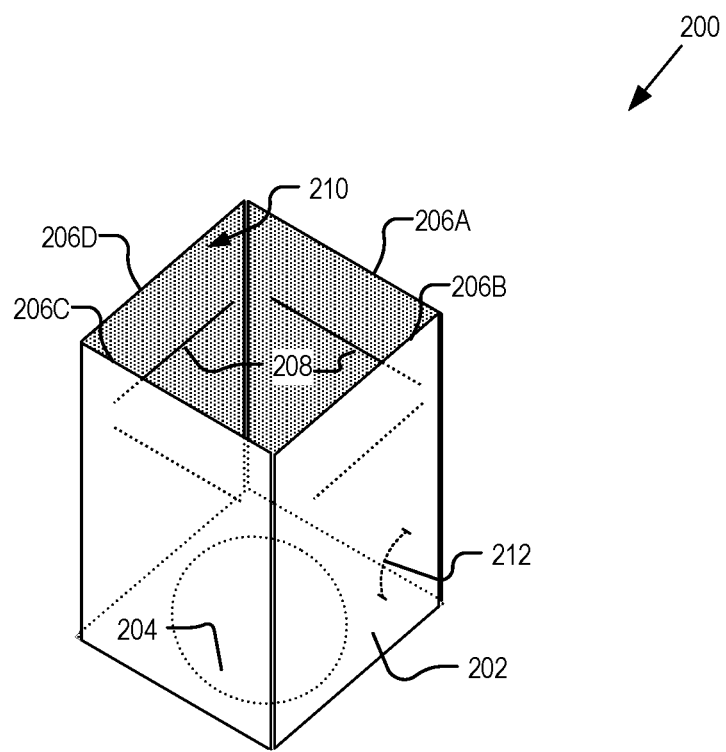
FIG. 2 illustrates an example housing for an optical assembly, in accordance with aspects of the present disclosure.

FIG. 2 illustrates an example housing 200 for an optical assembly, in accordance with aspects of the present disclosure. The illustrated example of housing 200 is shown as including a base 202 and fingers 206A-206D. Base 202 is shown as including a hole 204, while fingers 206A-206D are shown as including registration features 208 etched on an interior surface 210 of the fingers 206A-206D. Housing 200 is one possible implementation of a housing that may be utilized to secure and/or align an optical assembly incorporated with the electronic component 145 of FIG. 1.

Figure 3A:
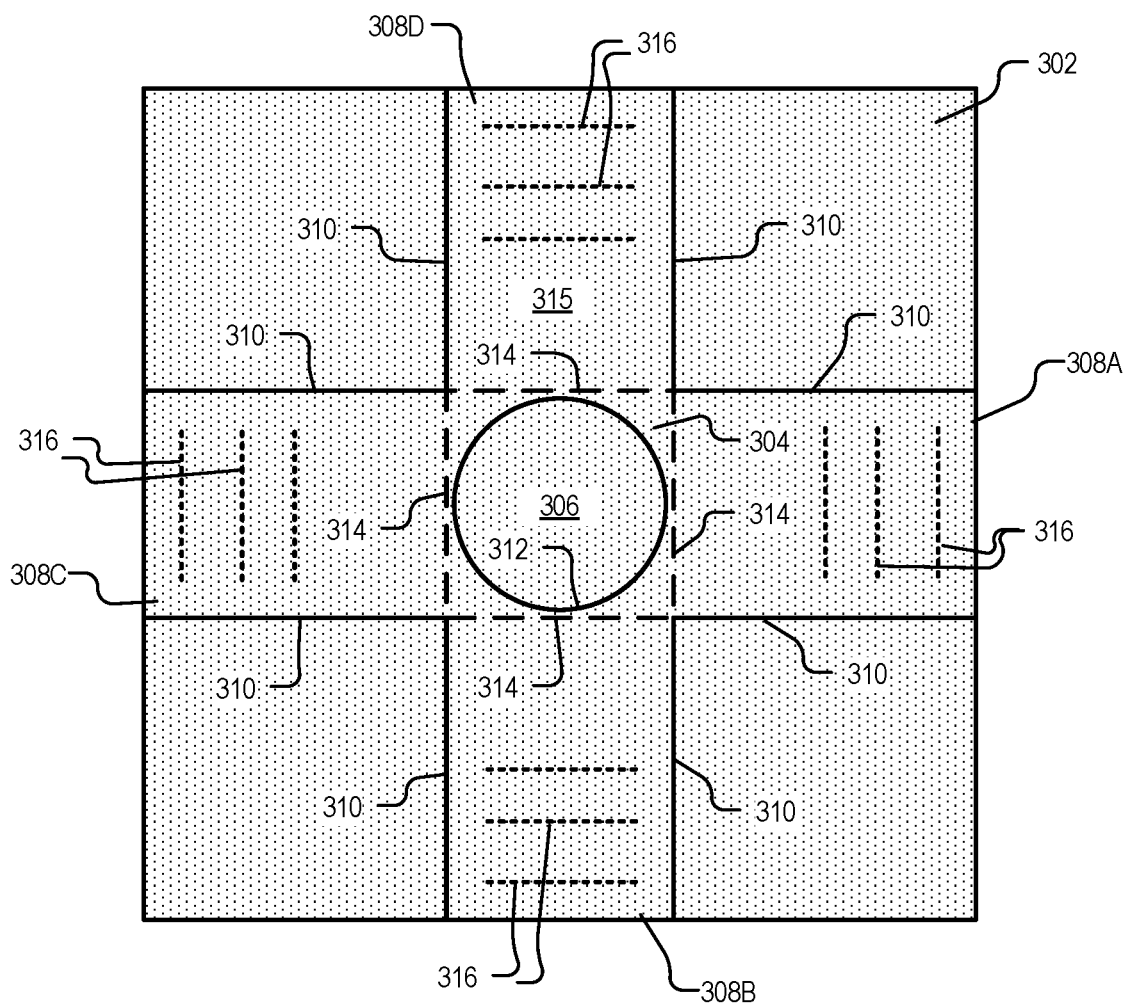
FIG. 3A illustrates an example sheet material etched to include a plurality of fingers, in accordance with aspects of the present disclosure.

As shown in FIG. 2, each of the fingers 206A-206D are bent at an angle (e.g., finger 206A is bent at angle 212) with respect to the base 202 to form the housing 200 for securing an optical assembly (not illustrated in FIG. 2). As shown, the base 202 and fingers 206A-206D form a single monolithic structure of sheet material. By way of example, FIG. 3A illustrates an example sheet material 302 etched to include a base 304 and a plurality of fingers 308A-308D, in accordance with aspects of the present disclosure. Sheet material 302 is one possible example of a sheet material that may be used to form any of the housings discussed herein, including housing 200 of FIG. 2. In some examples, sheet material 302 is sheet metal. Furthermore, although FIG. 3A illustrates base 304 as having a rectangular or square shape, base 304 may be any shape such as a circular shape, a hexagonal shape, an octagonal shape, and the like. In some examples, base 304 is a planar base having substantially planar top and bottom surfaces formed from the sheet material 302. In addition, FIG. 3A illustrates four fingers 308A-308D formed from the sheet material 302. However, sheet material 302 may be etched to provide a housing that includes any number of fingers including one or more.

In some aspects, the fingers 308A-308D are formed by way of an etching process that etches cuts 310 completely through sheet material 302. The same process may also be utilized to etch a cut 312 to form hole 306. The process of etching cuts 310 and 312 may include use of a mechanical and/or chemical etching process. For example, a cutting instrument, such as a laser cutting system or die cutter, may be used to etch cuts 310 and 312. In another example, a mask may be applied to surface 315 where a subsequent chemical etching process may be performed to etch cuts 310 and 312.

FIG. 3A also illustrates several relief features 314 that may optionally be etched onto the surface 315. As described above, the fingers 308A-308D may be subsequently bent to form the housing (e.g., housing 200 of FIG. 2). Thus, relief features 314 may be etched onto the surface 315 to aid in the subsequent bending of the fingers. In one example, the relief features 314 are etched as grooves into the sheet material 302. In some aspects, the relief features 314 correspond to a location of the bend axis for each of the respective fingers 308A-308D.

Further illustrated in FIG. 3A are registration features 316. In some aspects, registration features 316 are etched onto the surface 315 of one or more of the fingers 308A-308D. The registration features 316 may be etched as grooves, bumps, or a combination of grooves and bumps on the surface 315. Each of the registration features 316 may also be configured to mate with a corresponding optical element of an optical assembly. In some aspects, the location, position, and/or size of each of the registration features 316 are configured to provide precise alignment of the optical elements that are to be subsequently secured by the housing.

In some examples, the surface 315 of the sheet material 302 is blackened, either prior to or after the bending of the fingers 308A-308D. In some examples, the blackening of surface 315 may include applying a black pigment, such as a carbon and/or copper chrome black to surface 315.

Figure 3B:
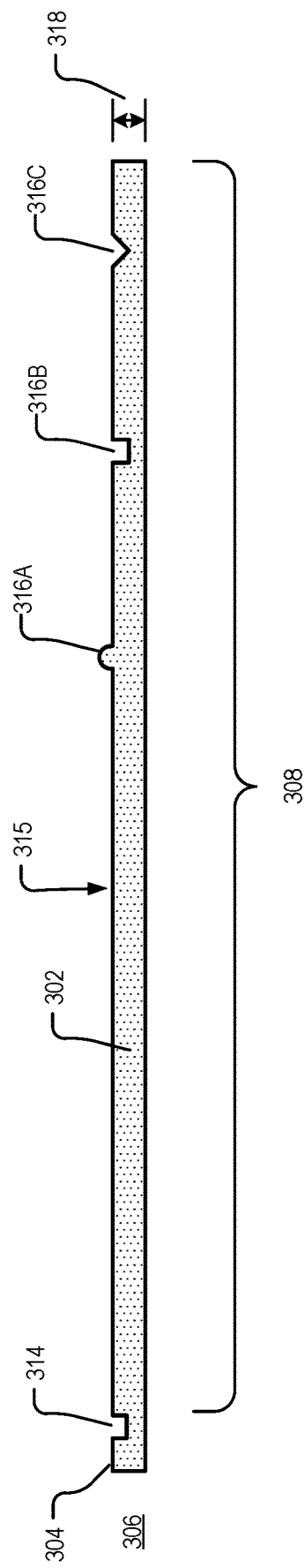
FIG. 3B illustrates cross-sectional view of a finger of a housing, in accordance with aspects of the present disclosure.

FIG. 3B illustrates cross-sectional view of an example finger 308 formed from sheet material 302, in accordance with aspects of the present disclosure. Finger 308 is one possible example of any of the fingers 308A-308D of FIG. 3A. Finger 308 is shown as including registration features 316A-316C. Also shown in FIG. 3B are the base 304 and the optional relief feature 314. The illustrated example of sheet material 302 is shown as having a thickness 318. In some examples, thickness 318 is less than 100 microns. In another example, thickness 318 is less than 50 microns. As mentioned above, the base 304 and fingers form a single monolithic structure of sheet material 302. Thus, in some examples, the base 304 and finger 308 have the same thickness 318.

FIG. 3B illustrates finger 308 as including three registration features 316A-316C. However, finger 308 may include any number of registration features including one or more. In some examples, finger 308 includes a plurality of registration features, each for securing a respective optical element of the optical assembly. For instance, registration feature 316A may be configured to mate with and secure a first optical element, registration feature 316B may be configured to mate with and secure a second optical element, and registration feature 316C may be configured to mate with and secure a third optical element. In another embodiment, the finger 308 may include a single registration feature for securing an entire optical assembly that includes multiple (pre-assembled) optical elements.

Figure 3C:
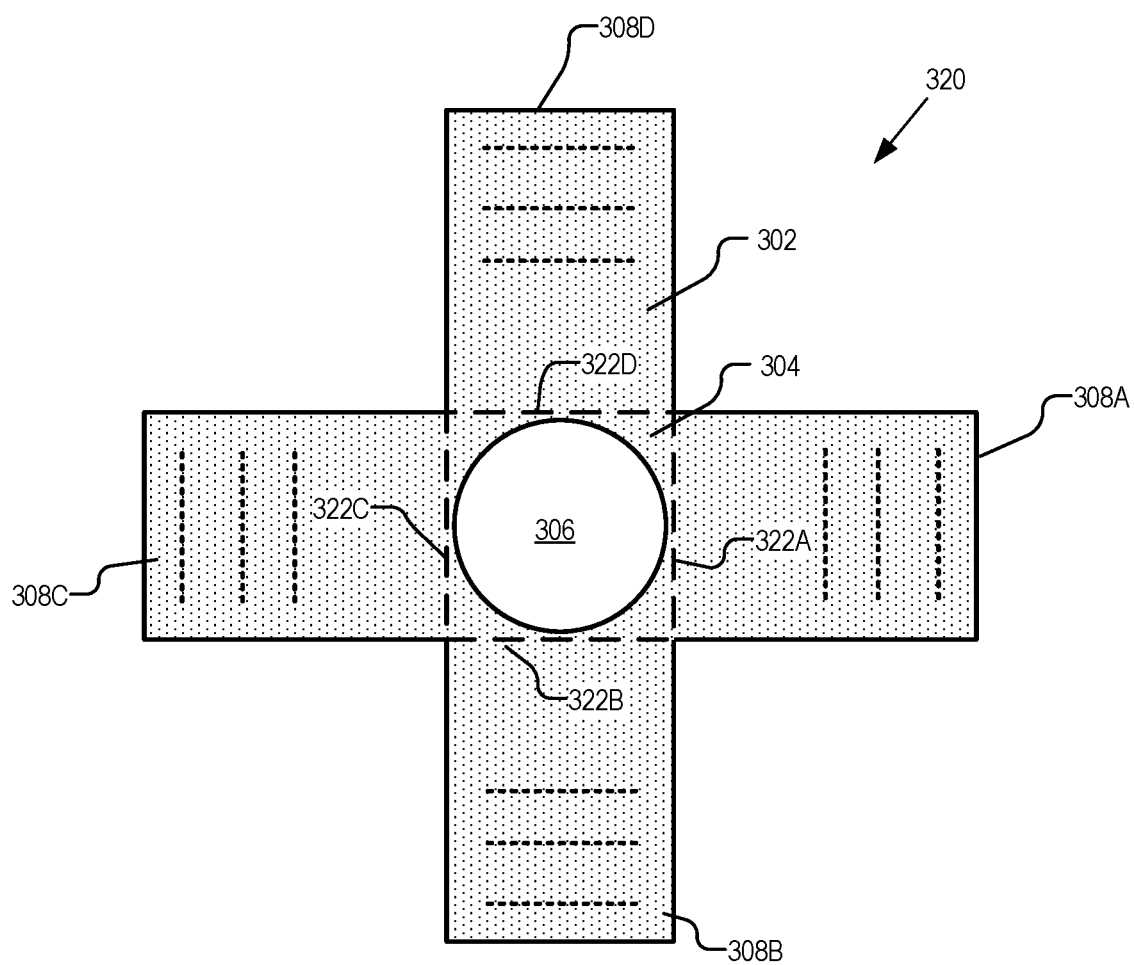
FIG. 3C illustrates a plan view of an example housing, prior to bending, in accordance with aspects of the present disclosure.

FIG. 3C illustrates a plan view of an example housing 320, after the etching process of FIG. 3A and prior to bending of the fingers 308A-308D, in accordance with aspects of the present disclosure. As shown in FIG. 3C, the excess portions of the sheet material 302 have been removed after etching to expose the resultant base 304, hole 306, and fingers 308A-308D of housing 320. FIG. 3C further illustrates bend axes 322A-322D, which may correspond to the location of the optional relief features 314 of FIGS. 3A and 3B, if included. Accordingly, each of the illustrated fingers 308A-308D may be bent along a corresponding bend axis (e.g., finger 308A may be bent along bend axis 322A, finger 308C may be bent along bend axis 322C, etc.).

Figure 3D:
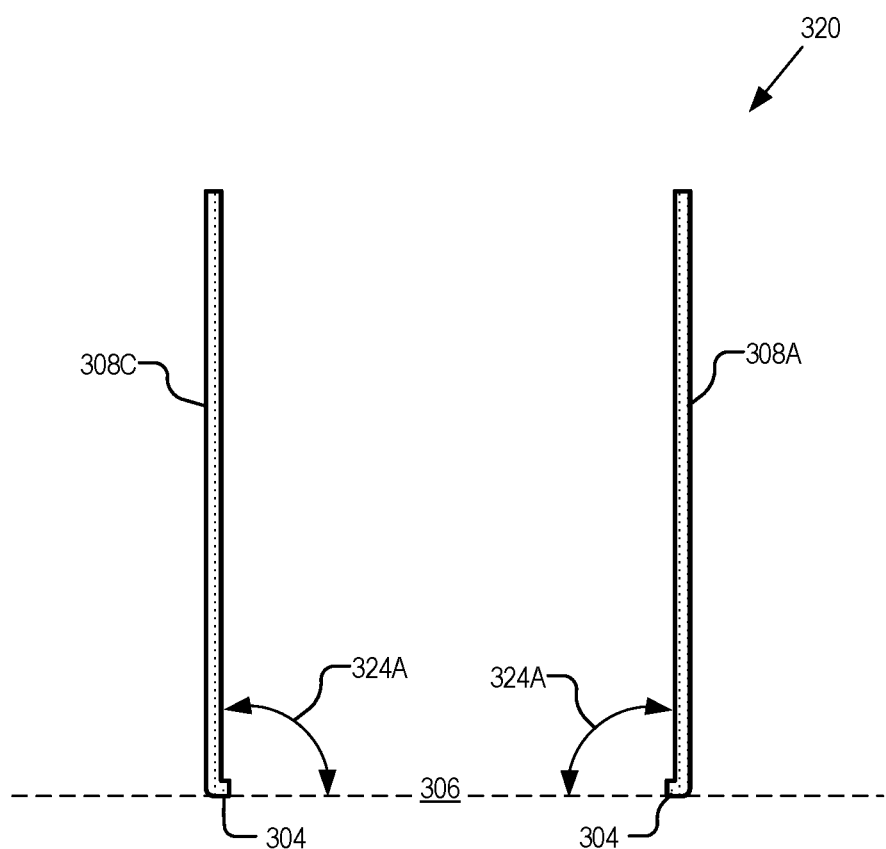
FIG. 3D is a cross-sectional view of a housing that illustrates the bending of the fingers, in accordance with aspects of the present disclosure.
Figure 3E:
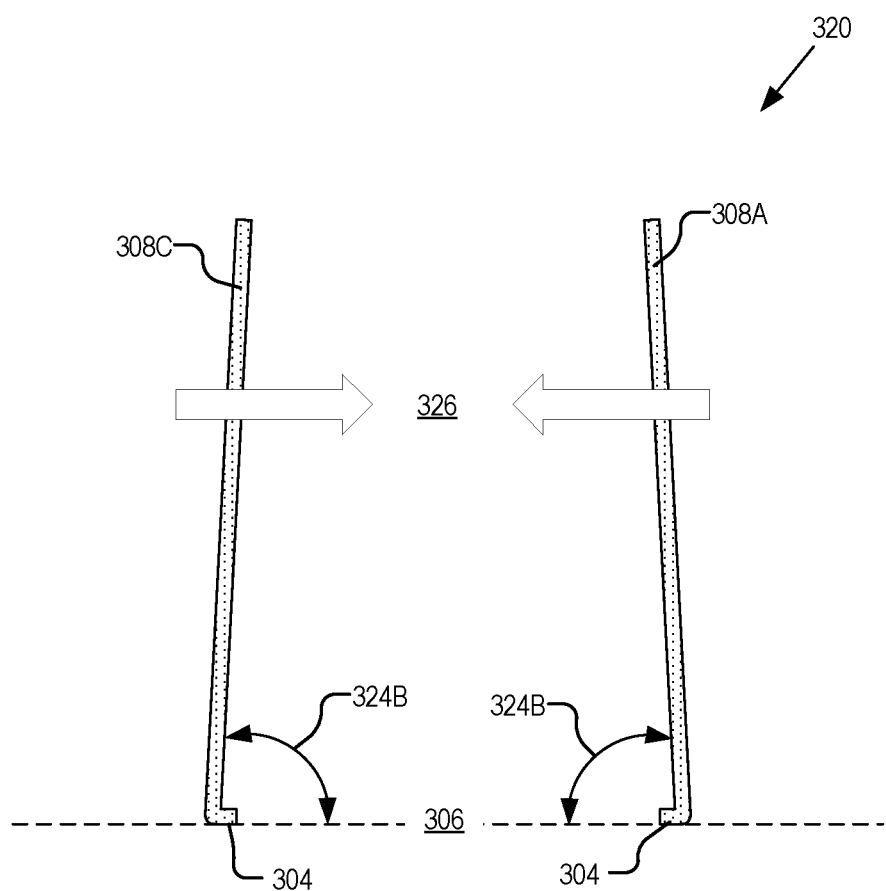
FIG. 3E is a cross-sectional view of a housing that illustrates the bending of the fingers at an acute angle to spring load the fingers, in accordance with aspects of the present disclosure.

By way of example, FIG. 3D is a cross-sectional view of housing 320 after the bending of fingers 308A and 308C along their respective bend axes, in accordance with aspects of the present disclosure. As shown in FIG. 3D, the fingers 308A and 308C are bent at an angle 324A with respect to the base 304. In one example, the angle 324A is approximately 90 degrees, such that the fingers 308A and 308C are substantially orthogonal to the base 304. In other implementations, angle 324A is an acute angle to spring load the fingers. For example, FIG. 3E is a cross-sectional view of housing 320 that illustrates the bending of the fingers 308A and 308C at an acute angle 324B to spring load the fingers, in accordance with aspects of the present disclosure. As shown in FIG. 3E, fingers 308A and 308C are bent at an acute angle 324B (i.e., less than 90 degrees with respect to the base 304), such that the fingers 308A and 308C apply an inward force 326. In some examples, the inward force 326 is applied to an optical assembly, once inserted into the housing 320, for securing the optical assembly within the housing 320.

Figure 3F:
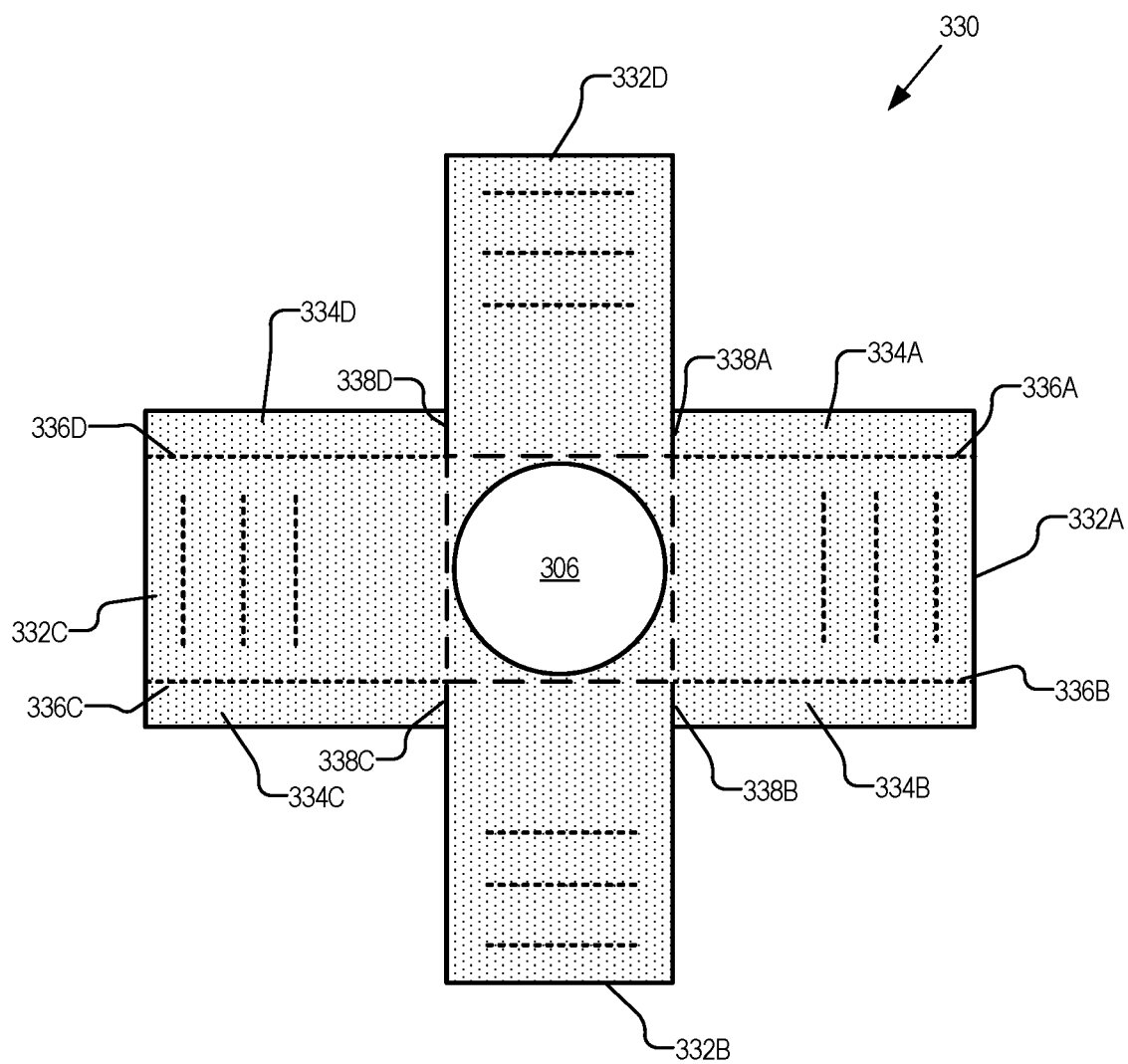
FIG. 3F illustrates a plan view of an example housing, prior to bending, that includes flanges, in accordance with aspects of the present disclosure.

FIG. 3F illustrates a plan view of an example housing 330, prior to bending, that includes corner flanges 334A-334D, in accordance with aspects of the present disclosure. In some examples, one or more of the fingers may be etched from the sheet material to include corner flanges, such as corner flanges 334A-334D. The corner flanges 334A-334D may be configured to overlap with an adjacent finger of the housing 330 for shielding an interface between the adjacent fingers. By way of example, corner flange 334A may be bent along bend axis 336A to shield an interface (e.g., corner) between fingers 332A and 332D, corner flange 334B may be bent along bend axis 336B to shield an interface between fingers 332A and 332B, corner flange 334C may be bent along bend axis 336C to shield an interface between fingers 332B and 332C, and corner flange 334D may be bent along bend axis 336D to shield an interface between fingers 332C and 332D. In some examples, the etching process of forming housing 330 may include etching cuts 338A-338D to separate the corner flanges from their adjacent fingers.

Figure 4A:
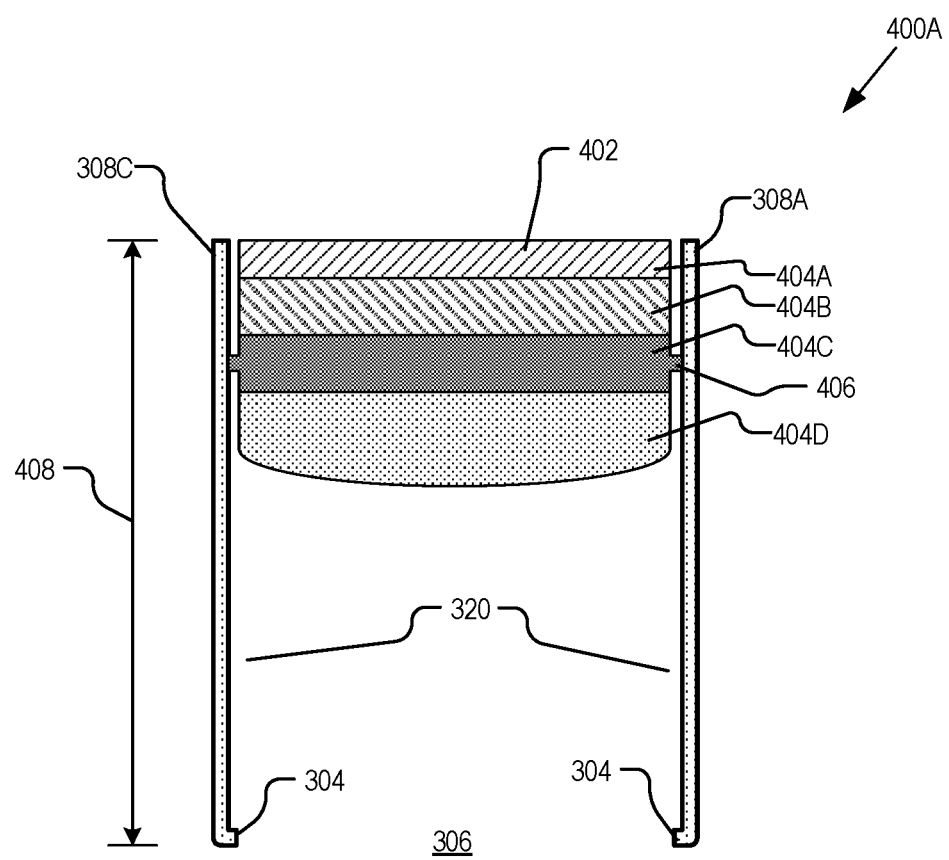
FIG. 4A is a cross-sectional view of an optical system that includes a housing and an optical assembly, in accordance with aspects of the present disclosure.

FIG. 4A is a cross-sectional view of an optical system 400A that includes housing 320 and an optical assembly 402, in accordance with aspects of the present disclosure. Optical system 400A is one possible implementation of an optical system that may be incorporated with the electronic component 145 of FIG. 1. The illustrated example of optical assembly 402 is shown as including optical elements 404A-404D. Although optical assembly 402 is shown as including four optical elements, optical assembly 402 may include any number of optical elements, including one or more. The optical assembly 402 may be configured to pass light to and/or from hole 306 and an electronic component (not shown in FIG. 4A). In some examples, each optical element 404A-404D may include one or more of a lens, a mirror, a diffuser, a filter, a prism, a window, a beam splitter, a diffraction grating, and the like. The illustrated example of optical element 404C is shown as including one or more flanges 406. In some examples, flanges 406 are configured to mate with a corresponding registration feature (e.g., registration features 316 of FIG. 3A) included in the interior surface of fingers 308A and 308C for securing and/or optically aligning the optical elements 404A-404D. Although FIG. 4A illustrates only optical element 404C as including a flange, one or more of the optical elements 404A, 404B, and 404D may also include flanges for mating with a corresponding registration feature of the housing 320.

Figure 4B:
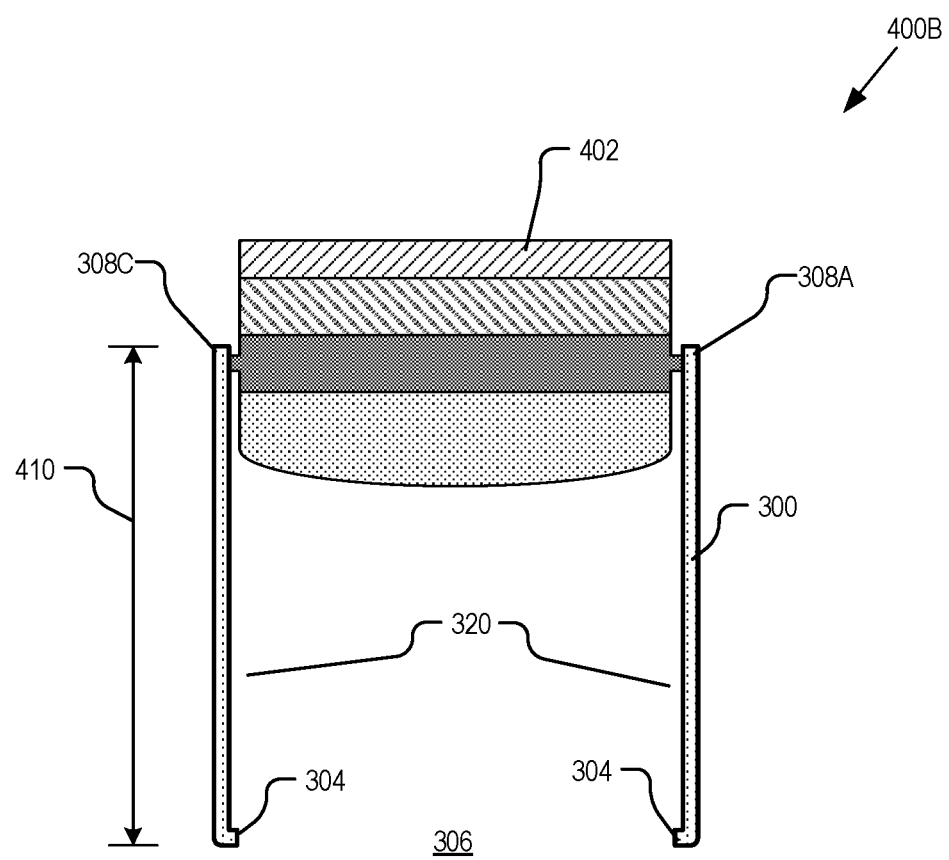
FIG. 4B is a cross-sectional view of another optical system that includes a housing and an optical assembly, in accordance with aspects of the present disclosure.

FIG. 4A also illustrates housing 320 as having a height 408. In some examples, height 408 corresponds to a length of the fingers (e.g., fingers 308A and 308C) and is configured such that the optical assembly 402 is completely encased within housing 320. That is, the height 408 may be, at least, as tall as the topmost optical element 404A of the optical assembly 402. In other examples, the height of the housing 320 is less than height of the topmost optical element, such that the optical assembly is only partially encased within housing 320. For example, FIG. 4B is a cross-sectional view of another optical system 400B that illustrates housing 320 having a height 410 that is less than a height of the optical assembly 402.

Figure 5:
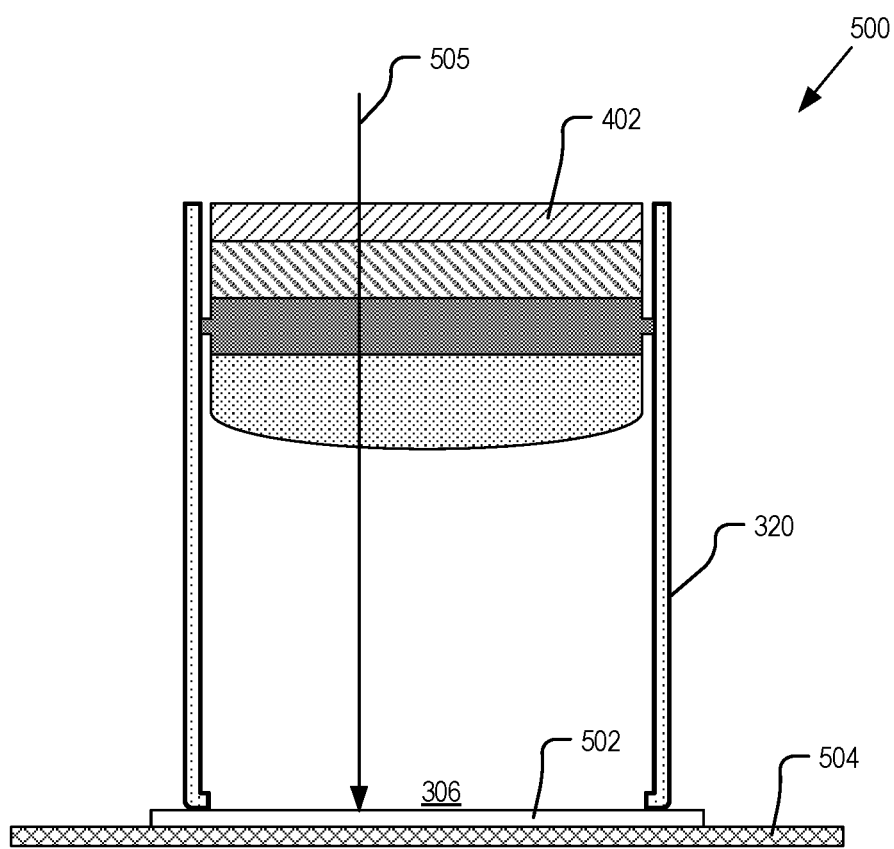
FIG. 5 is a cross-sectional view of an optical system disposed on an electronic component, in accordance with aspects of the present disclosure.

FIG. 5 is a cross-sectional view of an optical system 500 disposed on an electronic component 502, in accordance with aspects of the present disclosure. Optical system 500 is shown in FIG. 5 as including optical assembly 402, housing 320, electronic component 502, and a printed circuit board (PCB) 504. Optical system 500, including electronic component 502, is one possible example of electronic component 145 of FIG. 1. In some embodiments, electronic component 502 is a sensor, such as, a camera, an image sensor, an optical sensor, a rangefinder, a LiDAR sensor, a Simultaneous Localization and Mapping (SLAM) sensor, and the like. In this example, optical assembly 402 is configured to receive light 505 and pass (e.g., focus) light 505 through hole 306 of the housing 320 onto the electronic component 502. In other examples, electronic component 502 is a laser or other light-emitting device, where light generated by the electronic component 502 propagates through hole 306 and then through optical assembly 402 into the environment.

In some embodiments, the housings discussed herein, may include an optional securing structure. In some aspects, the securing structure is configured to secure the fingers of the housing to one another. In some implementations, the securing structure is configured to reduce and/or prevent mechanical deflection of the fingers either during or after the optical assembly has been placed within the housing.

Figure 6A:
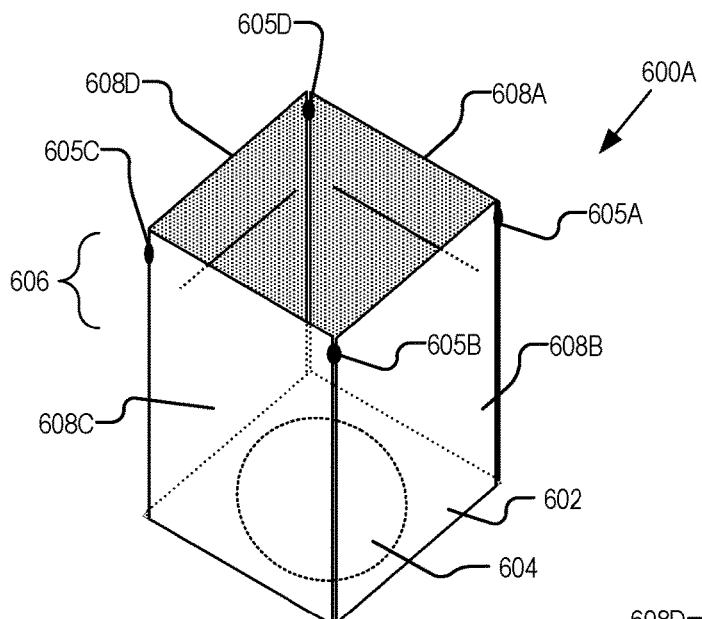
FIGS. 6A, 6B, and 6C illustrate various configurations of a securing structure for securing the fingers of a housing to one another, in accordance with aspects of the present disclosure.
Figure 6B:
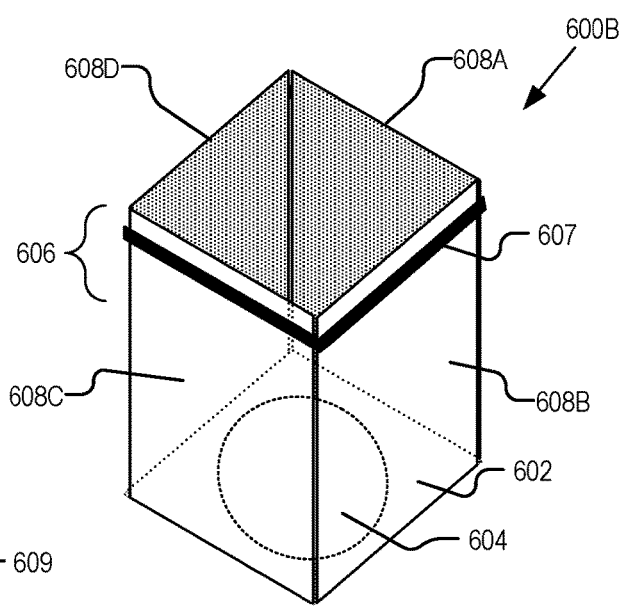

FIGS. 6A-6B illustrate various configurations of a securing structure, in accordance with aspects of the present disclosure. With regards to FIG. 6A, a housing 600A is illustrated that includes a base 602 having a hole 604, and fingers 608A-608D. Also shown in FIG. 6A are securing structures 605A-605D. Securing structures 605A-605D may be glue, adhesive, and/or solder. As shown in FIG. 6A, the securing structures 605A-605D are disposed in a distal region 606, opposite the base 602, of the housing 600A in-between adjacent fingers. For example, securing structure 605A is shown as disposed within the distal region 606 between finger 608A and finger 608B. Similarly, securing structure 605B is shown as disposed between finger 608B and finger 608C.

FIG. 6B illustrates a housing 600B that includes another example securing structure 607 that is configured as a collar. In some examples, the securing structure 607 comprises a rigid or elastic material that is disposed around a periphery of the fingers 608A-608D in the distal region 606 of the housing 600B.

Figure 6C:
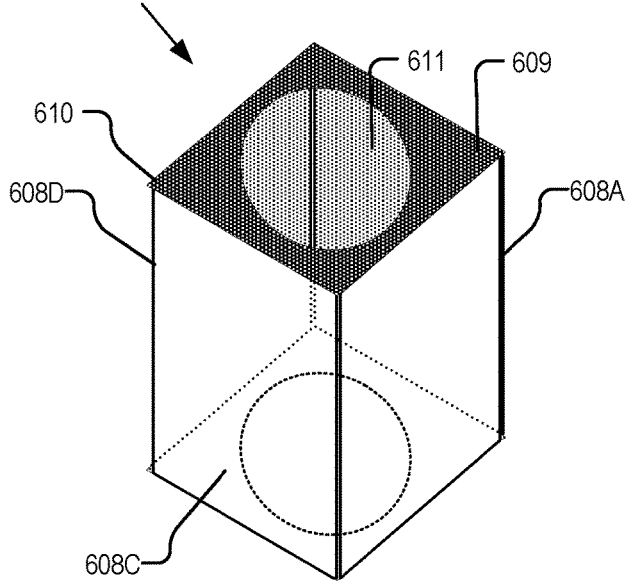

FIG. 6C illustrates a housing 600C that includes yet another example securing structure 609 that is configured as a lid. In some examples, the securing structure 609 may comprise a sheet material, such as sheet metal. As shown, the securing structure 609 may be disposed on a distal end 610 of the fingers 608A-608D for securing the fingers 608A-608D to one another. In some examples, securing structure 609 includes a groove or other mechanism for mating with the distal ends 610 of the fingers 608A-608D. As shown, securing structure 609 also includes a hole 611. The hole 611 is configured to pass light to or from the optical assembly that may be included within housing 600C.

Figure 7A:
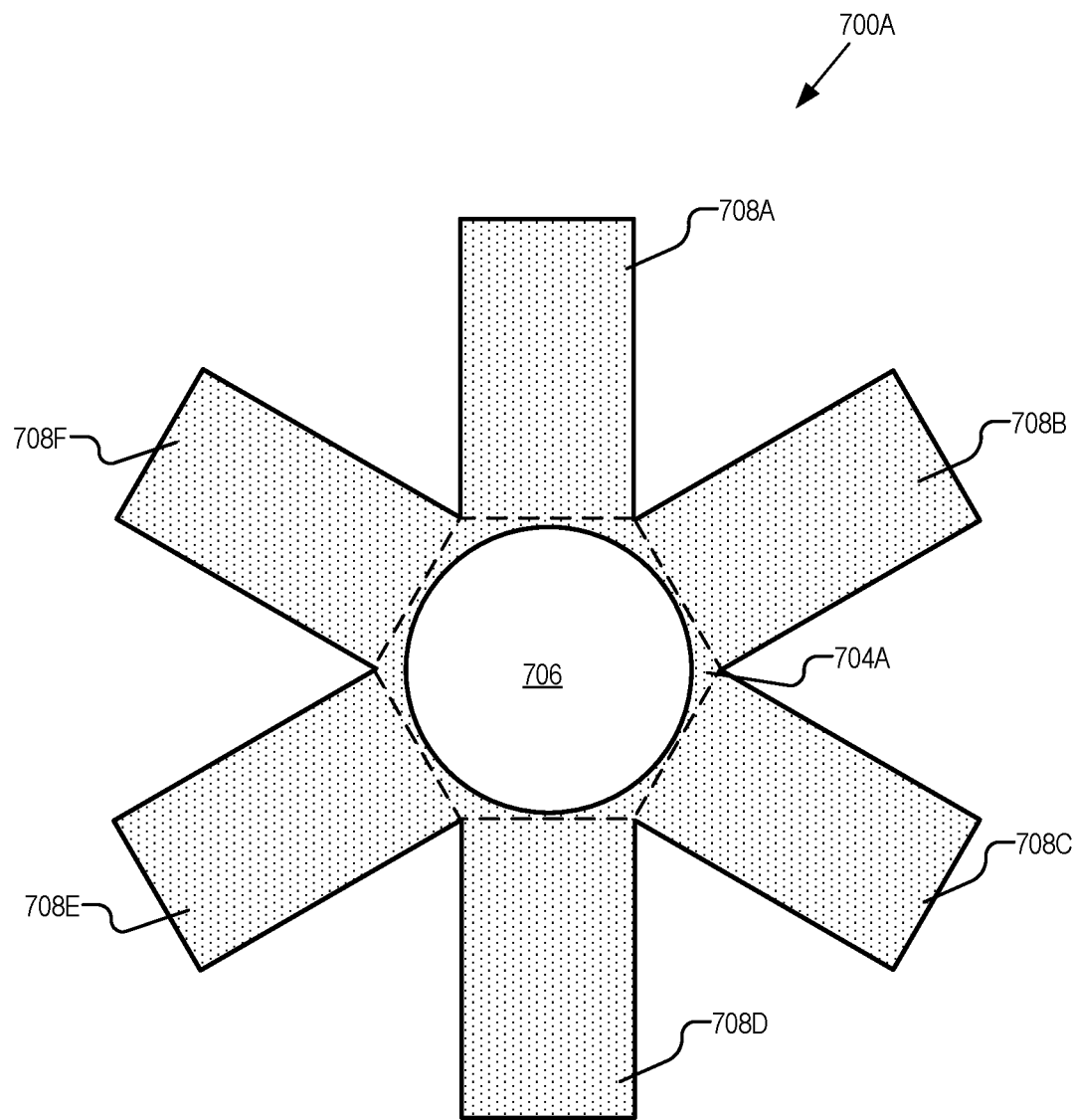
FIGS. 7A-7D illustrate a plan view of housings, prior to bending, that include various numbers of fingers, in accordance with aspects of the present disclosure.
Figure 7B:
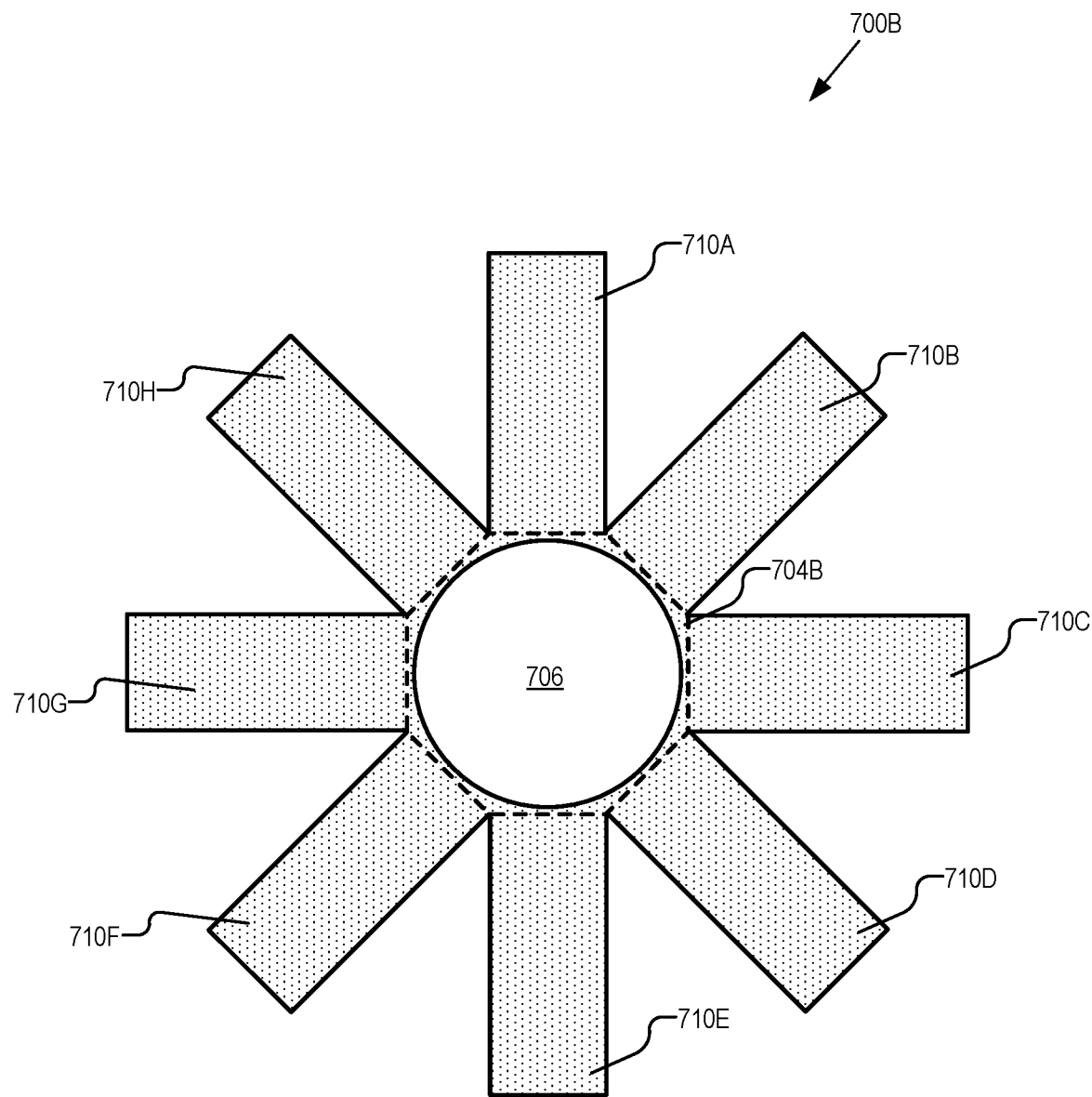

The housings discussed above, including housing 200 of FIG. 2, housing 320 of FIG. 3C, and the housings 600A-600C of FIGS. 6A-6C are illustrated as including four fingers. However, as discussed above, embodiments of the disclosed housings may include any number of fingers, including one or more. By way of example, FIG. 7A illustrates a plan view of a housing 700A, prior to bending, that include six fingers 708A-708F. The base 704A of housing 700A is also shown as including a hexagonal shape as well as a hole 706. Similarly, FIG. 7B illustrates a plan view of a housing 700B that includes eight fingers 710A-710H as well as an octagonal-shaped base 704B.

Figure 7C:
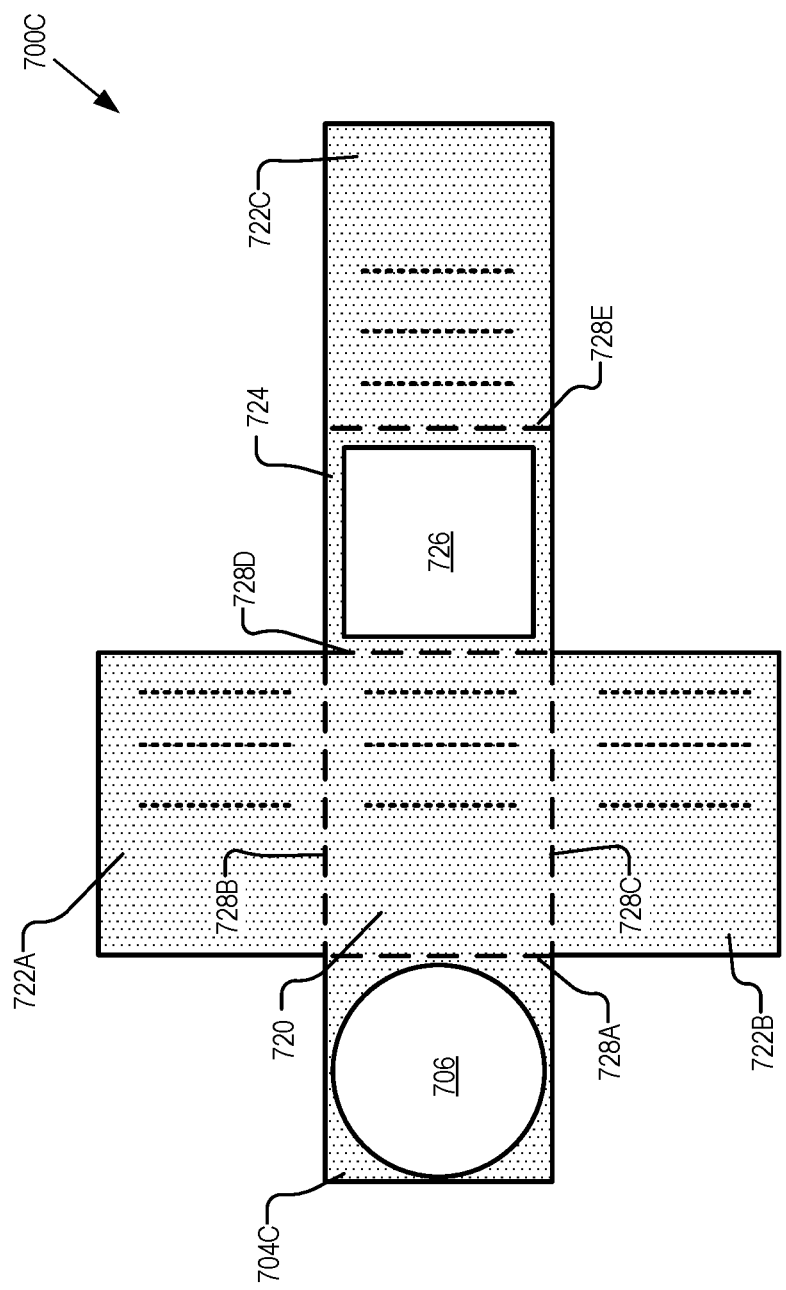

FIG. 7C illustrates an example housing 700C that includes a base 704C and a single finger 720. As shown in FIG. 7C, finger 720 includes sidewalls 722A-722C as well as a lid 724. Lid 724 is shown as including a hole 726 for passing light to or from the optical assembly. The bending of housing 700C to form a completed, or at least partially-completed housing, may include bending the finger 720 along bend axis 728A, bending sidewall 722A along bend axis 728B, bending sidewall 722B along bend axis 728C, bending lid 724 along bend axis 728D, and bending sidewall 722C along bend axis 728E.

Figure 7D:
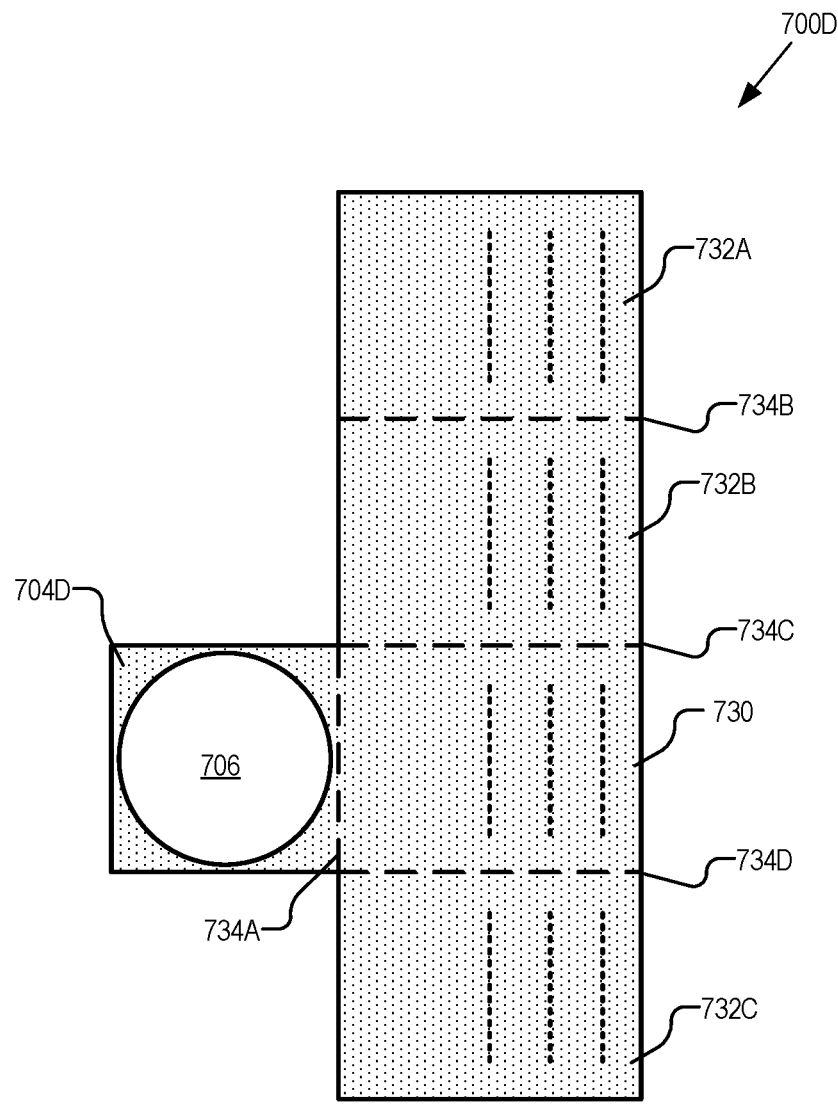

FIG. 7D illustrates an example housing 700D that includes a base 704D and a single finger 730. As shown in FIG. 7D, finger 730 includes sidewalls 732A-732C. The bending of housing 700D to form a completed, or at least partially-completed housing, may include bending the finger 730 along bend axis 734A, bending sidewall 732A along bend axis 734B, bending sidewall 732B along bend axis 734C, and bending sidewall 732C along bend axis 734D.

Figure 8:
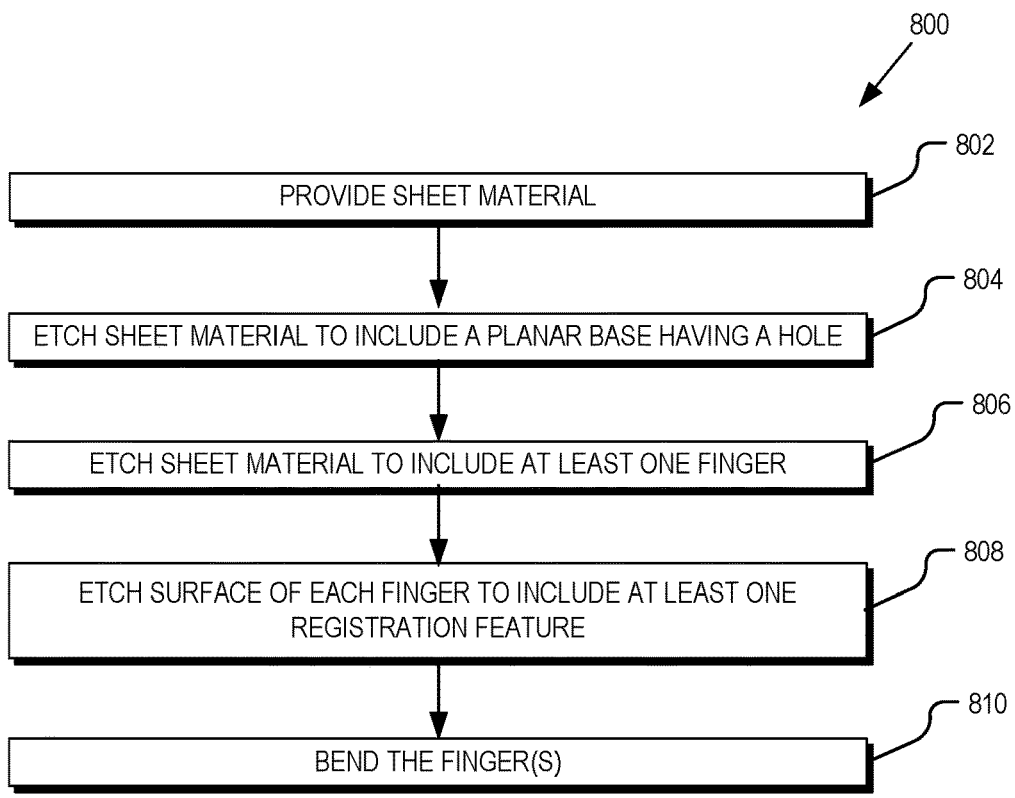
FIG. 8 is a flow chart illustrating an example process for forming a housing for an optical assembly, in accordance with aspects of the present disclosure.

FIG. 8 is a flow chart illustrating an example process 800 for forming a housing for an optical assembly, in accordance with aspects of the present disclosure. Process 800 is an example process that may be implemented to form any of the housings discussed herein. Process 800 is described with reference to FIG. 3A.

Process block 802 includes providing a sheet material, such as sheet material 302 of FIG. 3A. As discussed above, sheet material 302 may include sheet metal and may have a thickness less than 100 microns. Next, in process block 802, the sheet material 302 is etched to include a base 304 having a hole 306. Etching the sheet material 302 may include a mechanical and/or chemical etching process, as described above. Process block 802 may also include etching one or more optional relief features 314 onto the surface 315 of the sheet material 302.

In a process block 806, the sheet material 302 is etched to form at least one finger, such as fingers 308A-308D. Etching the sheet material 302 to form fingers 308A-308D may include etching cuts 310 completely through the sheet material 302. In a process block 808, the surface 315 of each of the fingers 308A-308D are etched to include one or more registration features 316. In a process block 810, the fingers are bent at an angle with respect to the base 304 (e.g., angle 324A of FIG. 3D, angle 324B of FIG. 3E, etc.).

Figure 9:
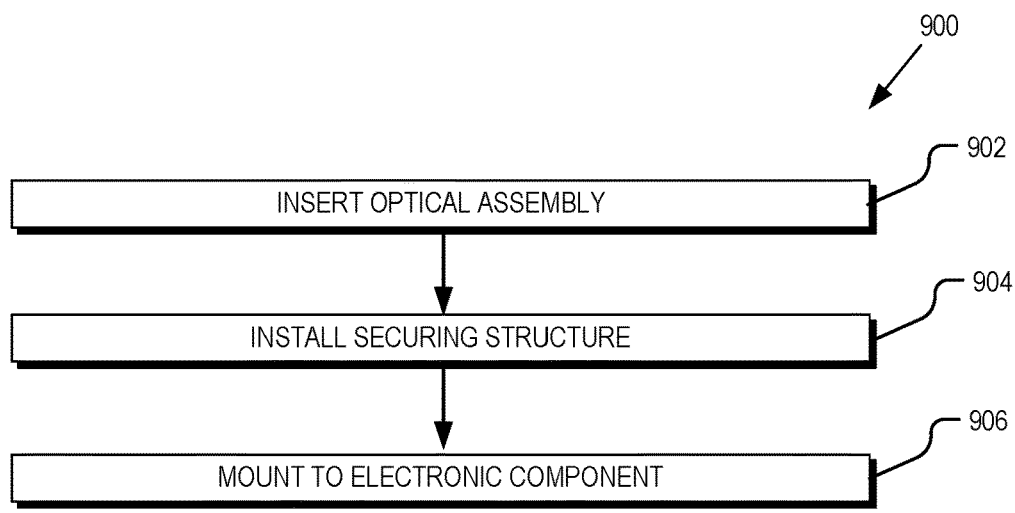
FIG. 9 is a flow chart illustrating an example process of assembling an optical system, in accordance with aspects of the present disclosure.

FIG. 9 is a flow chart illustrating an example process 900 of assembling an optical system, in accordance with aspects of the present disclosure. Process 900 is one possible implementation of a process for assembling any of the optical systems disclosed herein, including optical system 500 of FIG. 5.

In a process block 902, the optical assembly 402 is inserted into the housing 320. As discussed above, the optical assembly 402 may include several optical elements, each having a flange for mating with a respective relief feature of the housing 320. Next, in a process block 904, a securing structure, such as any of the securing structures 605A-605D, 607, and/or 609 of FIGS. 6A-6C are installed. In a process block 906, the housing 320 is mounted to an electronic component, such as the electronic component 502 of FIG. 5.

The order in which some or all of the process blocks appear in each process described above should not be deemed limiting. Rather, one of ordinary skill in the art having the benefit of the present disclosure will understand that some of the process blocks may be executed in a variety of orders not illustrated. For example, with reference to process 800 of FIG. 8, process block 808 may be performed prior to process block 806, such that the registration features 316 are etched before the cuts 310 are etched to form the fingers 308A-308D. By way of another example, with reference to process 900 of FIG. 9, process block 906 may be performed prior to process block 902, such that the housing 320 is mounted to the electronic component 502 before the optical assembly 402 is inserted into the housing 320.

Embodiments of the invention may include or be implemented in conjunction with the manufacture of an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A housing for an optical assembly, the housing comprising:
   a base having a hole configured to pass light to or from an electronic component; and
   a finger bent at an angle with respect to the base for securing the optical assembly within the housing, wherein the finger includes one or more registration features etched on a surface of the finger for securing the optical assembly within the housing, and wherein the base and the finger comprise a single monolithic structure of a sheet material.

2. The housing of claim 1, wherein the finger includes at least one corner flange that overlaps with an adjacent finger of the housing for shielding an interface between the finger and the adjacent finger.

3. The housing of claim 1, wherein the finger is bent at an angle that is substantially orthogonal to the base.

4. The housing of claim 1, wherein the finger is bent at an acute angle to spring load the finger to apply an inward force for securing the optical assembly within the housing.

5. The housing of claim 1, further comprising:
   at least one additional finger; and
   a securing structure disposed on a distal region of the housing, opposite the base, for securing the finger and the at least one additional finger to one another.

6. The housing of claim 5, wherein the securing structure comprises glue, adhesive, or solder, disposed between the finger and the at least one additional finger.

7. The housing of claim 5, wherein the securing structure comprises a collar disposed around a periphery of the finger and the at least one additional finger.

8. The housing of claim 5, wherein the securing structure comprises a lid disposed on a distal end of the finger and the at least one additional finger, wherein the lid comprises a hole for passing the light to or from the optical assembly.

9. The housing of claim 1, wherein the sheet material comprises sheet metal.

10. The housing of claim 9, wherein the sheet metal has a thickness that is 100 microns or less.

11. The housing of claim 1, wherein the housing comprises a total of two, four, six, or eight fingers.

12. An optical system for use with an electronic component, the optical system comprising:
    a housing; and
    an optical assembly disposed within the housing, wherein the housing comprises:
      a base having a hole configured to pass light to or from the electronic component; and
      a finger bent at an angle with respect to the base for securing the optical assembly within the housing, wherein finger includes one or more registration features etched on a surface of the finger for securing the optical assembly within the housing, and wherein the base and the finger comprise a single monolithic structure of a sheet material.

13. The optical system of claim 12, wherein the finger is bent at an acute angle to spring load the finger to apply an inward force for securing the optical assembly within the housing.

14. The optical system of claim 12, further comprising:
    at least one additional finger;
    a securing structure disposed on a distal region of the housing, opposite the base, for securing the finger and the at least one additional finger to one another.

15. The optical system of claim 12, wherein the optical assembly comprises one or more optical elements selected from the group consisting of: a lens, a mirror, a diffuser, a filter, a polarizer, a prism, a window, a beam splitter, and a diffraction grating.

16. The optical system of claim 12, wherein the electronic component comprises at least one of: an image sensor, an optical sensor, a rangefinder, a LiDAR sensor, a Simultaneous Localization and Mapping (SLAM) sensor, a laser, or a light-emitting device.

17. A method of forming a housing for an optical assembly, the method comprising:
    providing a sheet material;
    etching the sheet material to include a base having a hole configured to pass light to or from an electronic component;
    etching the sheet material to include at least one finger;
    etching a surface of the at least one finger to include one or more registration features, wherein the registration features are configured to secure the optical assembly within the housing; and
    bending the at least one finger, wherein the at least one finger is bent at an angle with respect to the base for securing the optical assembly within the housing.

* * * * *